Figure 1:
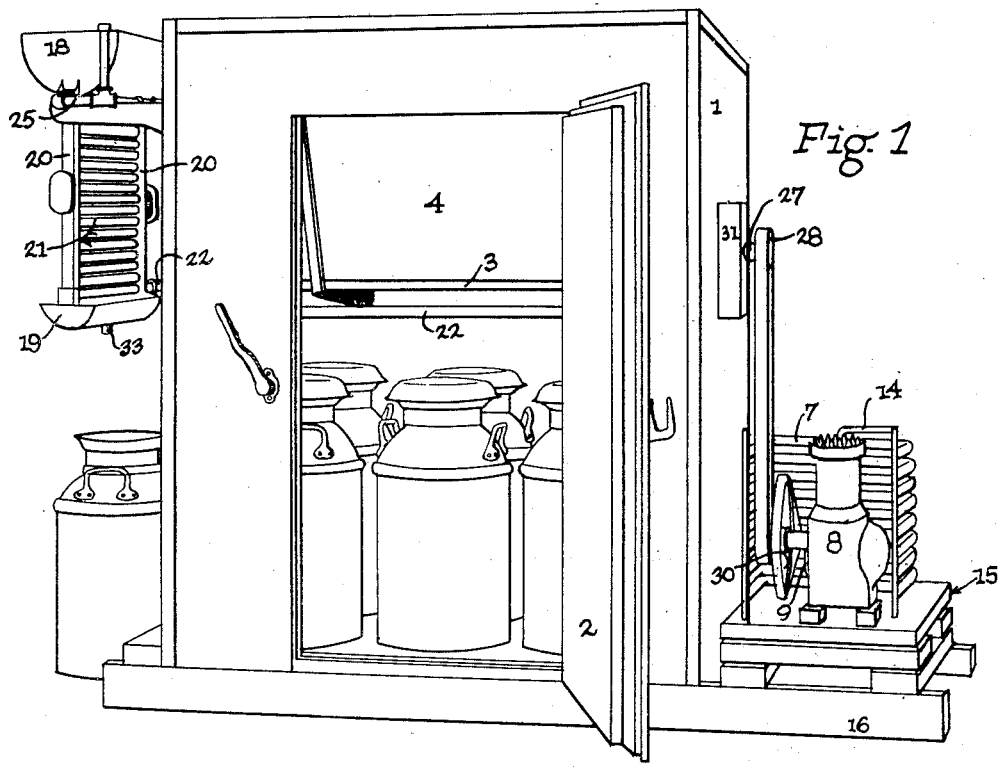

Sept. 17, 1929.  C. C. SPREEN  1,728,578

REFRIGERATING APPARATUS

Filed Dec. 15, 1924  2 Sheets-Sheet 1

Chas C. Spreen
Inventor
by Smith & Freeman
Attorneys

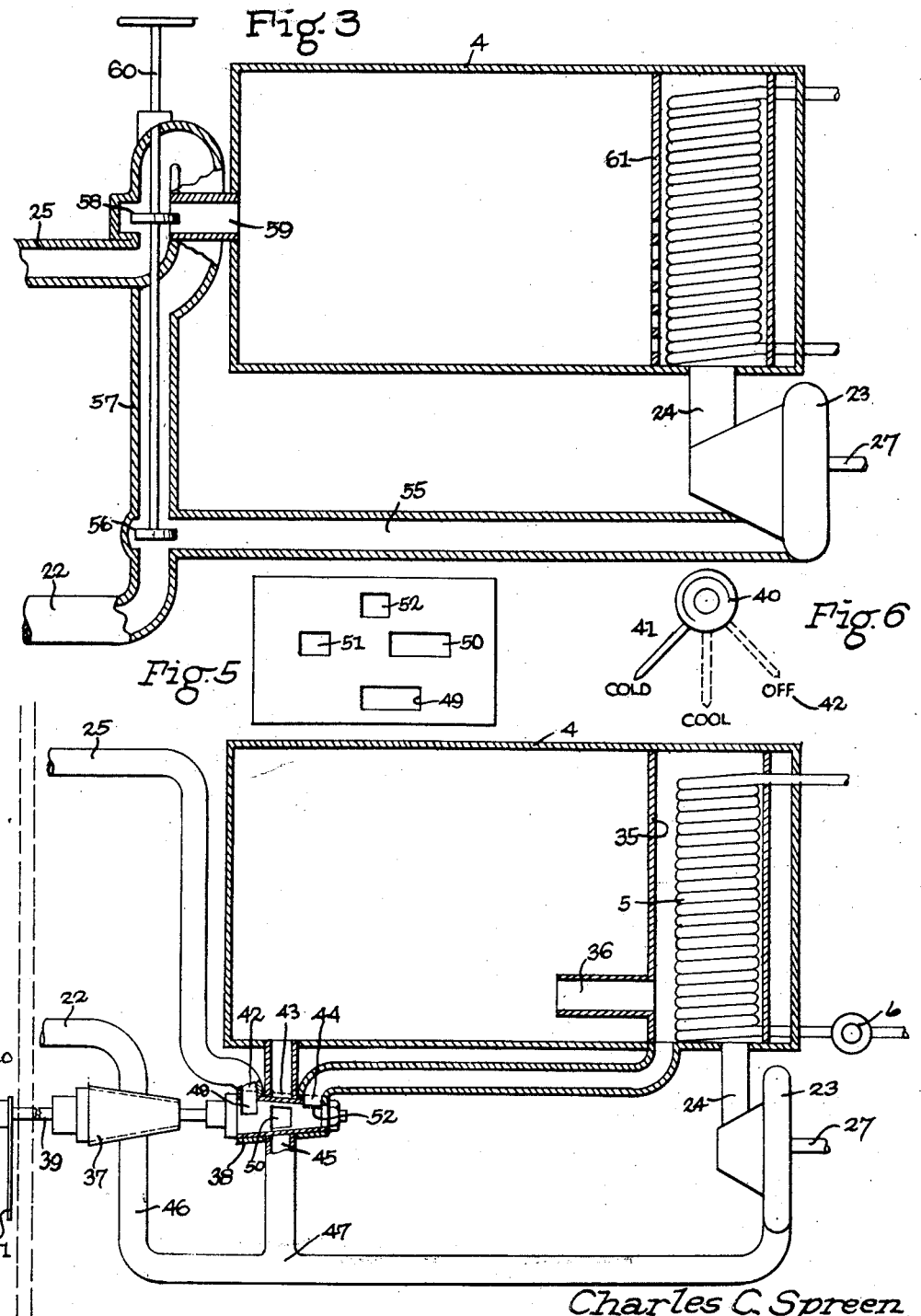

Patented Sept. 17, 1929

1,728,578

UNITED STATES PATENT OFFICE

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN

REFRIGERATING APPARATUS

Application filed December 15, 1924. Serial No. 755,865.

This invention relates to refrigerating apparatus of the mechanical type and has for its main object the improvement of such devices in point of rapidity of operation and thermal efficiency; a secondary object is the provision of a cold storage cabinet in combination with means for precooling the food stuffs which are to be stored therein. Still more limited objects sought by the specific embodiment herein set forth are the provision of a simple, compact, and inexpensive apparatus suitable for the use of comparatively small farms and dairies whereby milk may be chilled quickly by mechanical refrigeration; the provision of a simple and self contained apparatus whereby the milk may be both chilled and stored; the provision of a milk storage apparatus of the mechanically refrigerated type wherein the running time of the mechanism shall be very small; the provision of an apparatus which can be conveniently shipped and assembled; while further objects and advantages of the invention will become apparent as the description proceeds.

As concerns the general objects of the invention heretofore mentioned, it is pointed out that nearly all mechanical refrigerating apparatus as designed for small installations comprise a compressor-condenser-expander system utilizing the latent heat of evaporation of a suitable refrigerant liquid to produce a temperature in a food compartment lying between about 32° and 40° F., temperatures less than 32° being undesirable because of possible injury to food stuffs by freezing and temperatures above 40° being undesirable because of danger of deterioration. In order to increase the idle periods of the operating machinery a brine tank is ordinarily used, the expansion coil being submerged in the brine so that the only access of heat thereto is by way of convection currents in the liquid. However, I have discovered that with the customary compositions of brine and under the normal operating conditions, the temperature of the brine is brought to or slightly below the reversing temperature, namely the temperature at which the density becomes a maximum and the direction of convection currents is reversed. The result of this is that as the temperature of the brine approaches this point the convection currents become comparatively feeble, the rate of heat transfer falls accordingly, insufficient heat is conveyed to the expansion coil to produce the evaporation of any substantial quantity of refrigerant, the compressor accordingly draws a high vacuum on its intake side and moves only a small quantity of refrigerant per minute, with the result that the friction and hysteresis losses become very great in proportion to the refrigerating effect produced and the thermal efficiency of the apparatus suffers correspondingly.

One of the important features of my invention, applicable to general use in domestic refrigeration, is the provision of means for effecting a mechanical circulation of the cooling liquid so as to effect a more rapid rate of heat transfer at all times and thereby still further decrease the running period and increase the ratio of beneficial work to operating wastes.

As concerns the more limited objects sought in connection with the specific embodiments herein illustrated the following considerations are important. In order to be kept without deterioration for any substantial length of time, or in order to stand shipment for any substantial distance, milk must have the animal heat removed at the earliest possible moment and afterwards be kept at a comparatively low temperature, the initial removal of the heat being the more important consideration. Mechanism for effecting this by the use of cold water, natural ice, and the like has long been known, but these mechanisms suffer the disadvantage of a comparatively slow rate of cooling or else of a very substantial difficulty of cleaning, added to which the difficult labor and annoyance of storing, transporting and handling ice is very great. Mechanism for the quick cooling of milk by mechanical refrigeration has been made on large scale and used by creameries and other commercial plants but suffer the disadvantage of being too expensive for the use of individual farmers, and of requiring a comparatively long running period before they become sufficiently cooled for operation, whereas the farm use requires the employment of a device which neither requires to be operated all night nor necessitates the farmers arising at an earlier hour than is already forced upon him.

Figure 2:
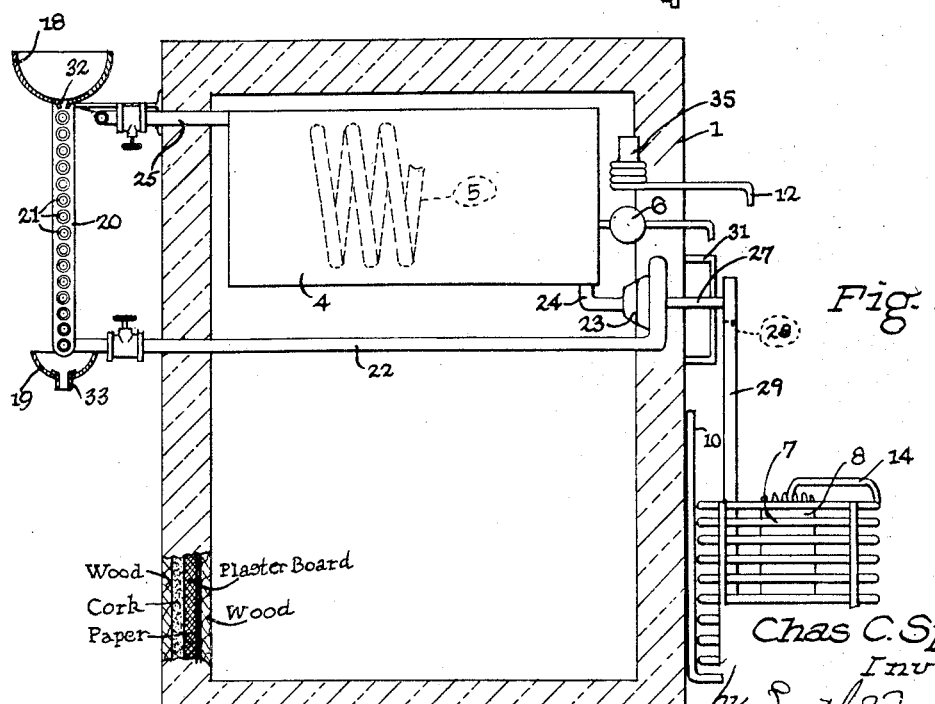

In the drawings accompanying and forming a part of this application I have illustrated certain embodiments of my invention wherein Fig. 1 is a perspective view of a practical dairy cooler constructed in accordance with my invention; Figs. 2, 3, and 4 are vertical, sectional views of brine tanks and circulation systems embodying my improvements; Fig. 5 is a development of one of the valves showing the theory of operation; and Fig. 6 is a detail.

Describing the parts by reference characters, 1 denotes a casing or housing of requisite size made of material of low heat conductivity such as lumber, plaster board, or insulating composition, preferably of several layers separated by charcoal, cork, paper, mineral wool, cellulose, air spaces or other insulating substances. The particular selection and arrangement of materials and layers shown in Fig. 2 is merely typical. The casing is provided with a suitable door 2 also of suitable heat insulating qualities and adapted to make a tight closure. Inside the upper part of this cabinet or casing, upon a suitable shelf or support 3 is located a sheet-metal brine tank 4 having therein an expansion coil 5 connected with an expansion valve 6 and condenser 7 with which is associated a compressor 8 driven by a suitable electric motor 9 or other prime mover. The expansion valve 6 is connected to the lowermost turns of the condenser by means of a liquid pipe 10 while the terminal turns of the coil 5 are connected by means of the pipe 12 with the inlet side of the compressor. The outlet or high pressure side of the compressor is connected to the topmost turns of the condenser by means of pipe 14 as shown in Fig. 1. In the preferred construction the compressor and condenser are carried by a suitable platform 15 mounted on suitable sleepers 16 which project beneath the casing or housing, thus producing a unitary structure.

Carried by one of the side walls of the casing is a suitable milk chilling device, the preferred form of the same comprising a horizontal trough 18 spaced above and parallel to a second horizontal trough 19, the two being connected at opposite ends by a frame-work which comprises hollow vertical headers 20—20. The opposed faces of these headers are formed with registering apertures in which are tightly mounted a plurality of horizontal glass tubes 21 forming a kind of ladder excepting that the tubes are preferably very close together. The end of one of these headers is connected by means of a horizontal pipe 22 with the outlet of a centrifugal pump 23 whose inlet is connected by a pipe 24 with the brine tank 4. The opposite end of the other header is connected by a suitable return pipe 25 with the brine tank 4. The shaft 27 of the pump projects outside the casing where it is provided with a pulley 28 which is connected by a belt 29 with a suitable pulley 30 operatively connected to the prime mover. In the present instance I have shown the pulley 30 as carried by the compressor shaft which is driven by the motor at a reduced speed more convenient for the purpose in view than a direct drive. Preferably the shaft 27 is made of considerable length to reduce the amount of heat loss therealong and its bearing is surrounded by a housing 31 of insulating material carried by the casing wall.

The bottom of the trough 18 is formed immediately above the glass tubes with a narrow elongated slot 32, and the bottom of the trough 19 is formed with a discharge spout 33. Any suitable refrigerant liquid is used in the compressor-condenser-expander system, preferably sulphur dioxide, although ethyl chloride, ammonia, or various hydro-carbons can be employed if desired. The tank 4 is filled with any suitable, low-freezing point, liquid such as a solution in water of sodium chloride, calcium chloride, glycerine, alcohol, etc. This liquid after having been cooled by the expanding refrigerant is forced by the pump through the cooling tubes 21 over which the warm milk is permitted to trickle from the trough 18 to the trough 19 whence it is returned to the cans from which it came, these cans being afterwards placed in the bottom part of the cabinet as shown in Fig. 1. The doors of the cabinet being now closed, the operation of the mechanism can be stopped since the cold cans reinforced by the cold brine tank will maintain the temperature inside the casing at an adequately low temperature for more than a day. Electricity when available is always the most convenient power source, but owing to the short length of time that the device requires to be operated, a small gasoline engine is entirely satisfactory. I have shown the terminal turns of the expansion coil as wrapped about a thermostat 35 adapted to stop the operation of the mechanism when a sufficiently low temperature is attained, and this in some cases proves to be a convenient feature, but is not ordinarily necessary.

The circulation system can be arranged in any one of numerous different ways, the preferred construction being shown in Fig. 4. The expansion chamber consists of an upright helical coil, located inside a cylindrical chamber or flue 35, slightly but not greatly larger than the coil and having one or more inlets 36 at the bottom, here shown as extending out into the body of the tank. It is not necessary that the flue 35 be located inside the tank 4, and in some respects it might be better outside although I have located it within for greater compactness and in order to obtain a certain amount of cooling of the brine in case the pump should fail at any time. The pump inlet 24 communicates with the bottom of this coil so that the brine is compelled to rise around it and descend inside it, except for such leakage as may exist through narrow slots between adjacent turns, thereby becoming thoroughly cooled.

I have shown the pipes 22 and 25 as connected to valves 37, and 38 respectively, these being preferably so associated as to be operated by a single stem 39 and handle 40 which is best located at the side of the casing near the milk cooler and is here shown as provided with a pointer 41 playing over an indicator scale 42, (see Fig. 6).

I have chosen turning plug type of valves for illustration, not because they are best in practice but because they are the easiest to illustrate the connections which I advocate, and in order to facilitate understanding Fig. 5 shows an idealized development of the rotatable member of valve 38. The casing of this valve is connected to the pipe 25 at the port 42, to the body of the tank at port 43, to the bottom of the flue 35 at port 44 and to the pump outlet at port 45. The valve 37 has only two ports and is connected between the pipe 22 and the pipe 46 which also leads from the pump being branched at 47.

The rotatable member of valve 38 is hollow and is formed in its wall with ports of varying lengths, port 49 rotating in the plane of port 42, ports 50 and 51 rotating in the plane of ports 43 and 45, and port 52 rotating in the plane of port 44. On starting the mechanism the brine is assumed to be warm and the pointer is set at "cold." Under this condition the valve 37 is open, port 49 registers with port 42 and port 52 registers with port 44. Accordingly the only brine in circulation is that contained in the pipes and flue, the great mass of warm brine in the tank taking no part in the circulation. The entire power of the apparatus being concentrated on this small quantity of brine the cooler quickly reaches working temperature and very likely begins to freeze the milk or gather frost.

Thereupon the attendant turns the pointer more or less toward "cool." This leaves the valve 37 still open and the port 49 because of its length remains in register with the port 42, but the port 52 is moved more or less out of communication with port 44 and instead thereof port 50 comes into register with port 43 and some of the warmer liquid from the body of the tank is brought into circulation thus enabling that to be cooled and preventing over cooling of the milk. When the milk has all been run through the cooler the handle is turned to "off" whereupon port 49 moves out of line with port 42, and ports 45 and 43 are connected by way of 50 and 51, valve 37 being now turned entirely off. It will be noted that valve 37 is not necessary except as regards possible leaks in the system, and may be omitted since the other valve alone will control the flow. After the cooler or other extension device has been cut off (such as an ice cream freezer) function of the pump is merely to circulate the brine about the expansion coil, and this is an important function even in the absence of any extension device such as milk coolers or ice-cream freezers, since the rate of heat transfer is hastened and the refrigerant caused to evaporate more rapidly than when only the feeble convection currents are employed.

In Fig. 3 I have shown another arrangement of circulating pipes and valves. The outlet pipe 55 leading from the pump is connected by a two way valve 56 to the extension outflow pipe 22 and also by a conduit 57 to a second two way valve 58. Another port of valve 58 is connected to the extension return pipe 25 and the third port communicates with the body of the tank by way of the pipe 59. I have shown valves of the reciprocating type connected to the single stem 60. The expansion coil is housed inside a sheet metal flue 61 perforated at one end for ingress of liquid and arranged to guide the same into contact with the pipe turns throughout a large part of its path.

Another arrangement is shown in Fig. 2 wherein the expansion coil 5ª is merely located inside the tank, the pump 23 being employed only during the time that the extension apparatus is in operation.

I do not limit myself to the use of a pump of the type illustrated or arranged at the point shown, nor to the use of a pump in connection with an extension apparatus, whether milk cooler or otherwise, since the mere mechanical agitation of the brine is advantageous. It will also be understood that by the term "brine tank" I do not restrict myself to the use of salt solution, since the word "brine" in this art signifies any low freezing point liquid, and the term "brine tank" denotes any cooling tank no matter what its contents may be. I do not limit myself to locating this tank in the same chamber with the stored food, nor do I limit myself to locating the expansion coils inside the body of the tank as herein shown, nor to locating the prime mover upon the same base with the compressor (it is particularly likely to be separate when an internal combustion engine is used), nor to any particular design of condenser, nor in any other respect except as specifically recited in my several claims which I desire may be construed, each independently of the limitations contained in other claims.

Having thus described my invention what I claim is:

1. Dairy apparatus comprising, in combination, an insulated storage chamber, a brine tank in air circulating relation therewith, a compressor, a condenser, and an expansion coil operatively connected together and constituting a unitary part of said apparatus, said expansion coil being located in cooling relation with said brine tank, a milk cooler located outside said storage chamber and comprising a plurality of tubes over which milk can trickle, circulating pipes connecting said tank with said tubes, a pump operatively connected to said circulating pipes, and a prime mover operatively connected to said compressor and pump.

2. Dairy apparatus comprising in combination, a plurality of horizontal sleepers, a storage chamber carried thereby and having top, bottom and side walls made of material of poor heat conductivity, said sleepers projecting beyond said chamber at one side, a brine tank supported in the upper part of said chamber, a compressor carried by the projecting portion of said sleeper, a condenser connected to said compressor, an expansion coil connected to said condenser and compressor, a milk cooler located upon the side wall of said chamber opposite the compressor, circulation pipes connecting said cooler and tank, a pump operatively associated with one of said pipes, and a prime mover operatively connected with said compressor and pump, said casing having a door in one of its remaining upright sides.

3. In a device of the character described, the combination with mechanical refrigerating apparatus of the compressor-condenser-expander type, and a prime mover therefor, of a brine tank, a refrigerating device outside of said brine tank and having brine passages, circulation pipes connected to said device, a circulating pump connected to said pipes and to said prime mover, and valve means adapted either to concentrate upon said expander all the brine flowing through said pipes or to divide the flow between the refrigerating device, expander, and tank.

4. In a dairy cooler, the combination with mechanical refrigerating apparatus of the compressor-condenser-expander type and a prime mover therefor, of a cabinet having walls of poor heat conductivity, a brine tank inside said cabinet, a refrigerating device outside said cabinet and having brine passages therein, pipes to said device, a pump operatively connected to said prime mover and pipes, and valve means operable exteriorly of said cabinet for controlling the circulation of said brine between said tank, pump, refrigerating device, and expander whereby the refrigerating effect produced by said apparatus can be apportioned between said refrigerating device and brine tank.

5. In a device of the character described, the combination with mechanical refrigerating apparatus of the compressor-condenser-expander type and a prime mover therefor, of a brine tank, a flue surrounding the expander and communicating with said brine tank, a refrigerating device outside of said brine tank and having brine passages, pipes to said device, a circulating pump adapted to be driven by said prime mover and having one of its ports communicating with said flue, and valves connecting said pipes to the brine tank and to the other port of said pump.

6. In a device of the character described, the combination with mechanical refrigerating apparatus of the compressor-condenser-expander type and a prime mover therefor, of a brine tank, a flue surrounding the expander and communicating with said brine tank, a refrigerating device outside of said brine tank and having brine passages, pipes to said device, a circulating pump adapted to be driven by said prime mover and having its inlet port communicating with said flue, return pipes connected with said tank and flue, respectively, and valve means adapted to govern the outflow of brine from said pumps to said device and the inflow of such brine to said tank and flue.

7. In refrigerating mechanism, in combination, a brine tank, a flue communicating therewith, mechanical refrigerating apparatus of the compressor-condenser-expander type, the expander being located inside said flue, a refrigerating device located outside of said tank and having brine passages therein, circulating pipes to said device, a pump connected to said pipes and tank and forming therewith a circulating system including said tank, flue, pump, pipes, and device, a prime mover for said compressor and pump, and valve means for controlling the flow from said pump and apportioning it between said device, tank, and flue.

8. In mechanism of the character described, the combination with a storage chamber having walls of low heat conductivity, of two, brine-containing, refrigerating devices, one inside and the other outside said chamber, mechanical refrigerating apparatus of the compressor-condenser-expander type, a brine pump, brine conduits constituting a circulating system between said pump and said two devices, valve means for apportioning the flow between said two devices, and a prime mover for said pump and compressor, the expander being located in heat transferring relation with a part of said circulating system.

In testimony whereof, I hereunto affix my signature.

CHARLES C. SPREEN.